Aug. 22, 1950     T. H. FAULKNER     2,519,829
DEVICE FOR SUPPLYING A MEASURED QUANTITY OF LIQUID

Filed June 12, 1947     8 Sheets-Sheet 1

INVENTOR
Thomas H. Faulkner
By Emery, Holcombe & Blair
ATTORNEYS

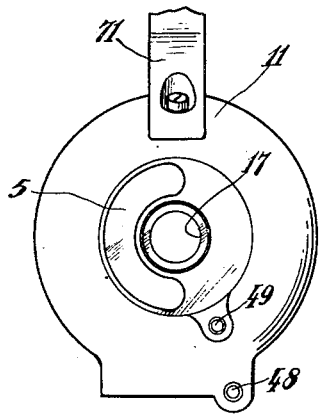
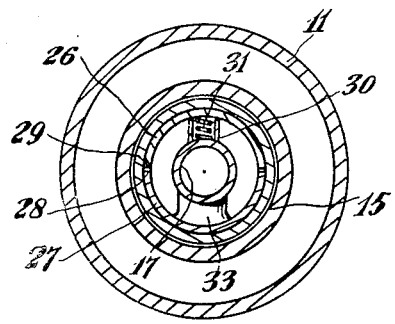
Fig. 2. Fig. 3.
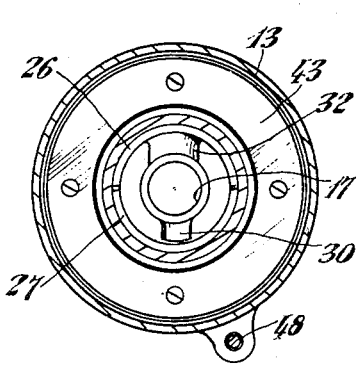
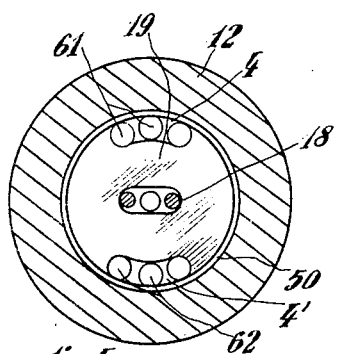
Fig. 4. Fig. 5.
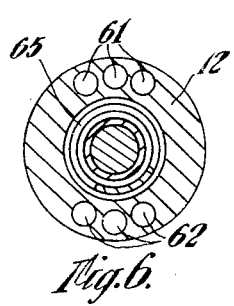
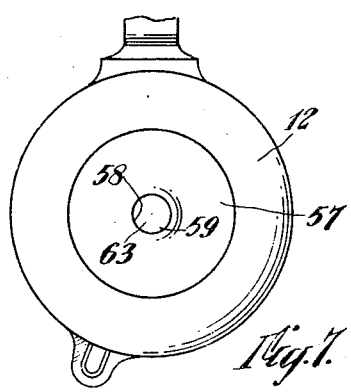
Fig. 6. Fig. 7.
INVENTOR
Thomas H. Faulkner
By Emery, Holcombe & Blair
ATTORNEYS

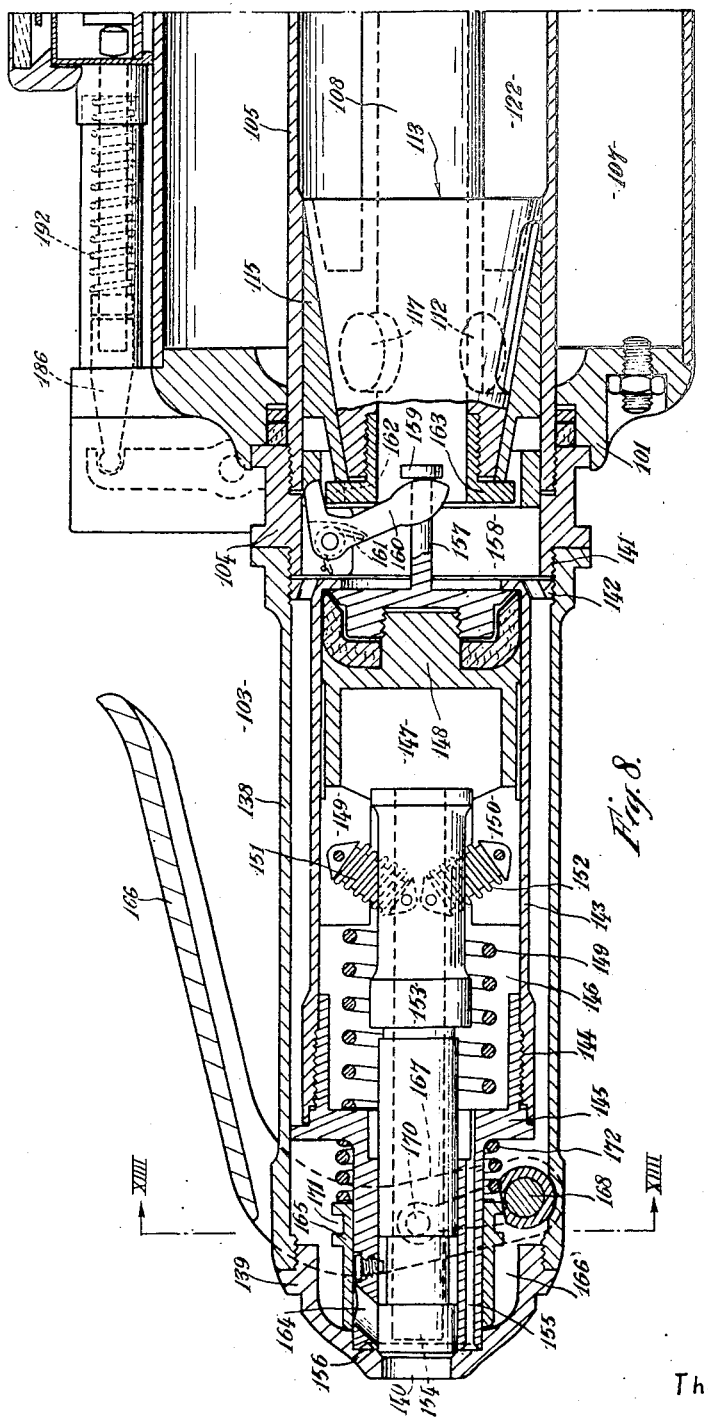

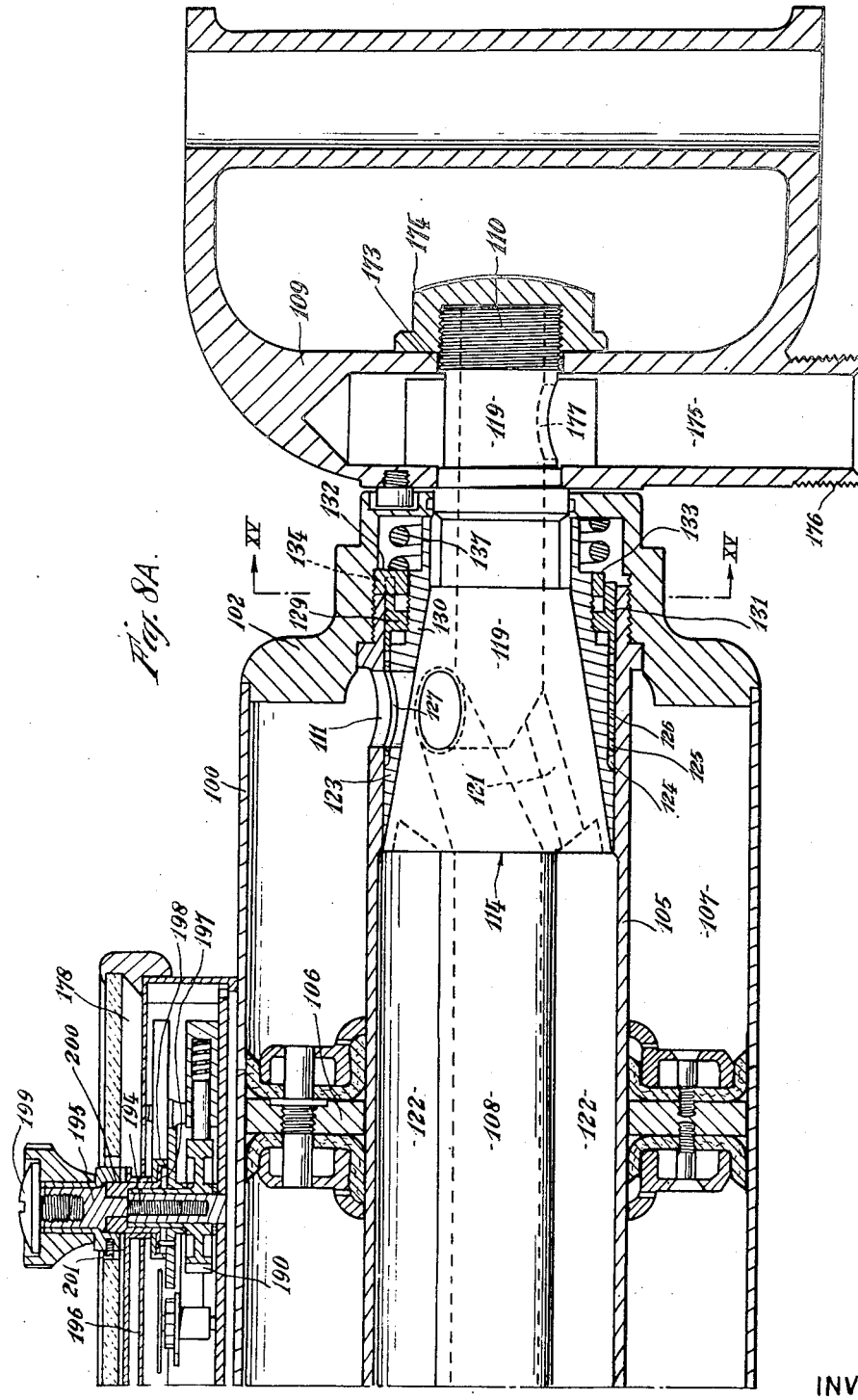

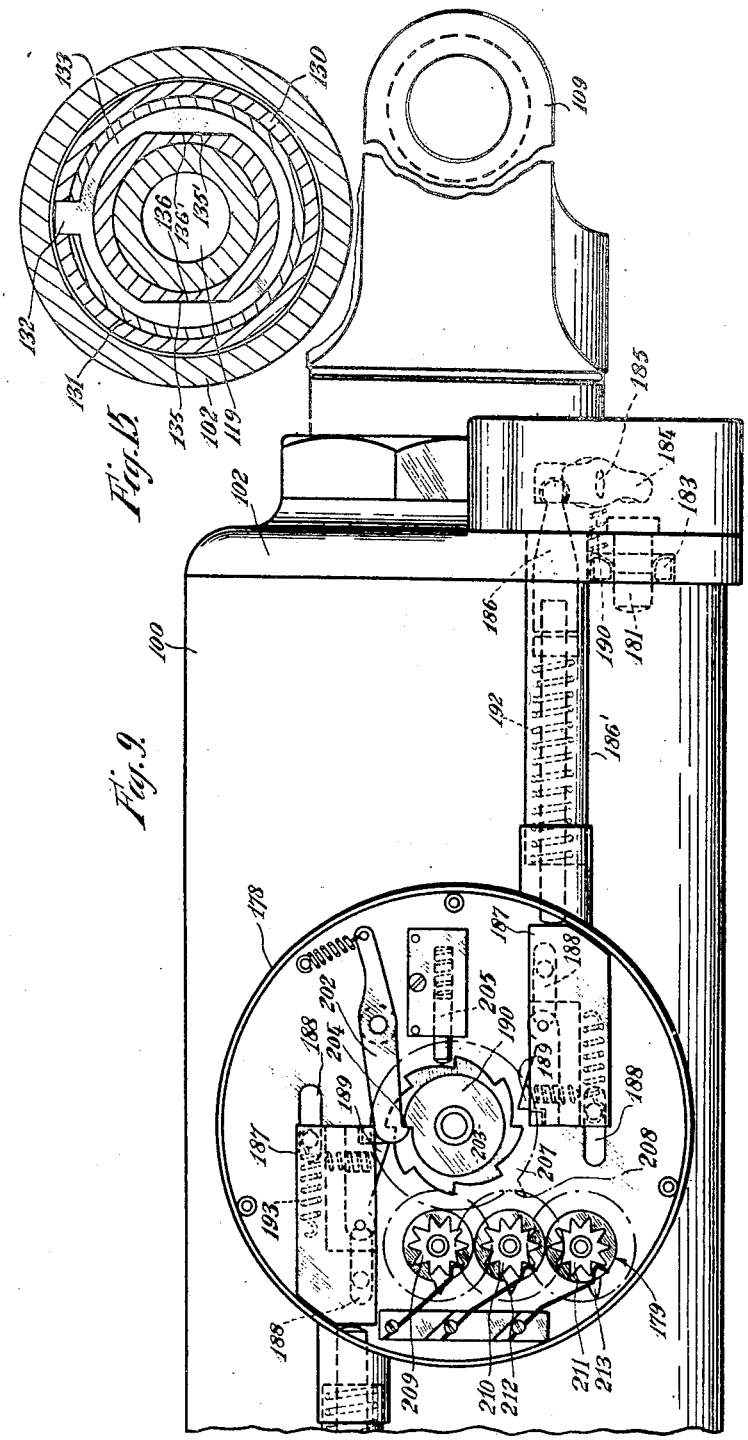

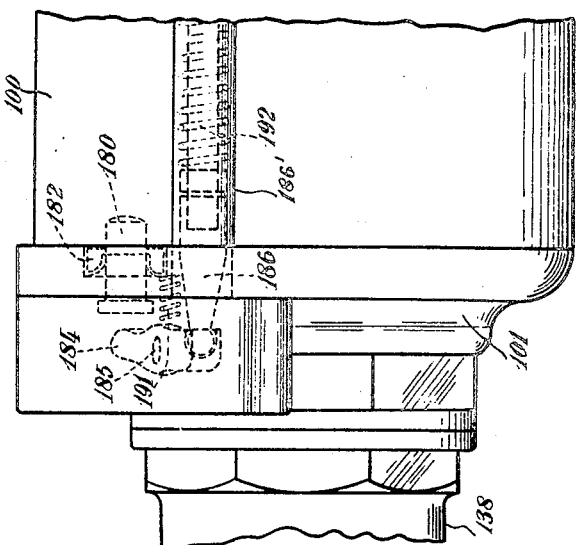
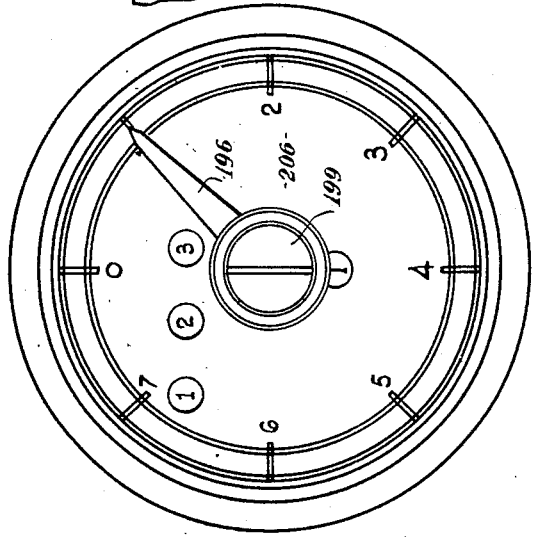
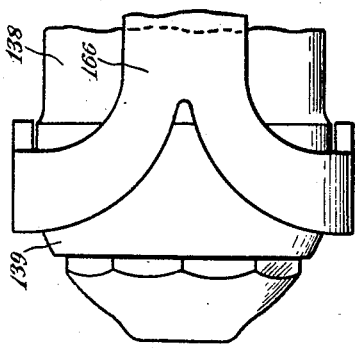

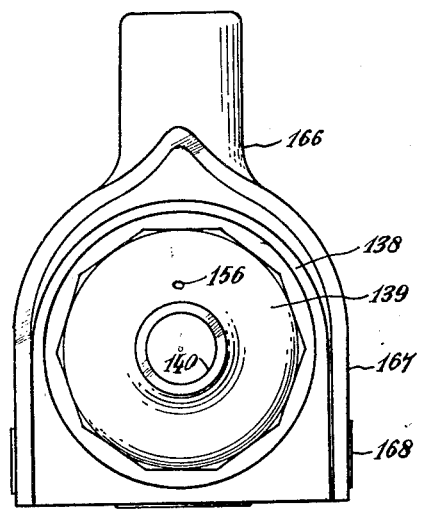
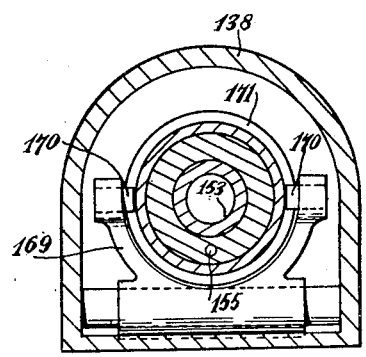
Fig.13. Fig.14.
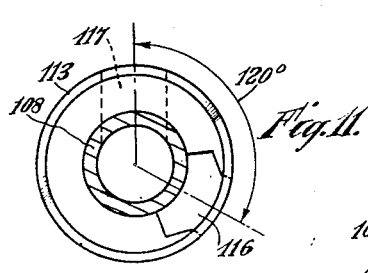
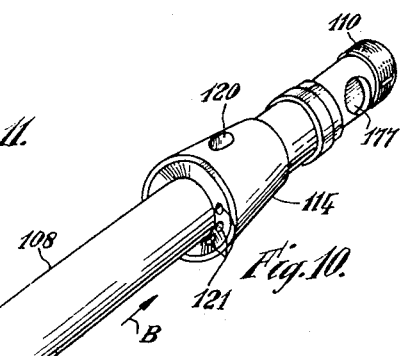
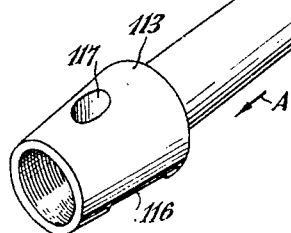
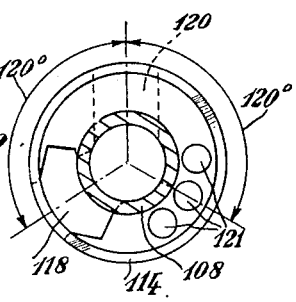

Aug. 22, 1950     T. H. FAULKNER     2,519,829
DEVICE FOR SUPPLYING A MEASURED QUANTITY OF LIQUID
Filed June 12, 1947     8 Sheets-Sheet 3
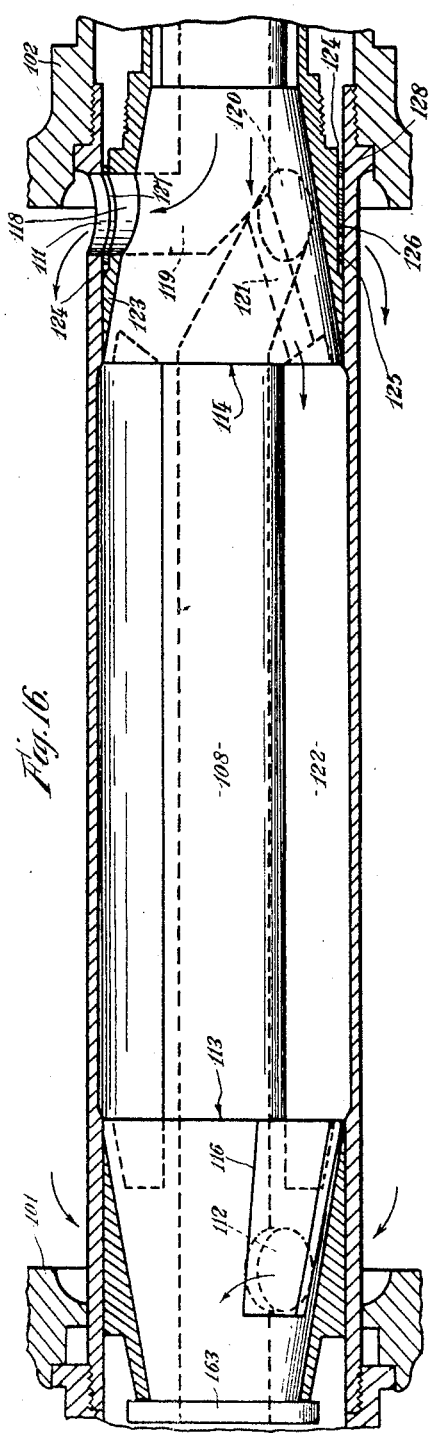
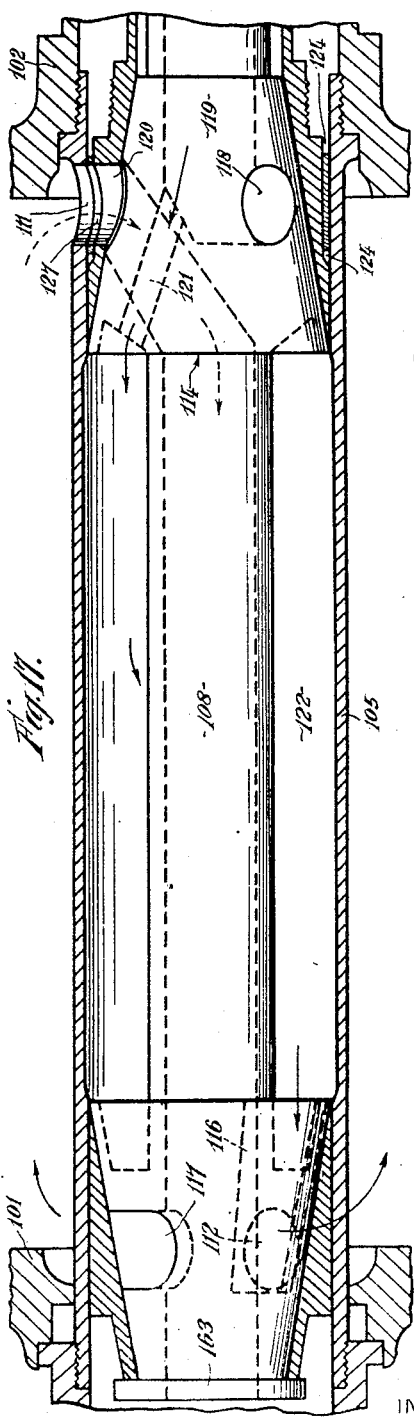
INVENTOR
Thomas H. Faulkner
By Emery, Holcombe & Blair
ATTORNEYS Patented Aug. 22, 1950

2,519,829

UNITED STATES PATENT OFFICE 2,519,829

DEVICE FOR SUPPLYING A MEASURED QUANTITY OF LIQUID

Thomas Hamilton Faulkner, North Cheam, England, assignor, by mesne assignments, to Associated British Engineering Limited, London, England Application June 12, 1947, Serial No. 754,153
In Great Britain July 1, 1946

15 Claims. (Cl. 222—38)

1

This invention relates to a device for supplying a measured quantity of liquid.

The object of the invention is to provide a simple and reliable non-drip device whereby the liquid can be quickly and cleanly delivered directly from a source of supply to the consumer, the device being particularly suitable, but in no way limited to, the supply of lubricating oil to internal combustion engines.

A further object of the invention is to provide a dispensing device of relatively light construction whereby it can be easily handled and be made mobile within limits determined by its connection to a source of supply.

With the foregoing objects in view apparatus for delivering measured volumes of liquid under pressure made according to the invention incorporates an automatic valve comprising a control piston subject to pressure variations in the liquid to be delivered, a lift valve slidably mounted relatively to said control piston to control a nozzle outlet, a toggle device operatively connecting said lift valve to said control piston, a return spring operatively disposed between said lift valve and said control piston, the arrangement being such that the control piston can move under pressure relatively to said lift valve to actuate said toggle device to withdraw said lift valve and open said nozzle outlet, said return spring restoring the parts to their starting positions when the pressure drops.

The foregoing and other features of the invention as set out in the appended claims will be further described with reference to the accompanying drawings in which Fig. 1 is a vertical longitudinal section through one form of device made according to the invention;

Fig. 2 is a rear end view with the valve operating lever removed;

Figs. 3, 4, 5 and 6 are, respectively, cross sectional views taken on lines A—A, B—B, C—C, and D—D, Fig. 1;

Fig. 7 is a front end view;

Fig. 8 is a vertical longitudinal section through a modified form of device made according to the invention;

Fig. 9 is a plan view of Fig. 8 with the meter cover removed;

Fig. 10 is a perspective view of the main valve structure in Fig. 8;

Figs. 11 and 12 are respectively end views of Fig. 10 looking in the directions of the arrows A and B, respectively;

Fig. 13 is a front end view of the nozzle cap;

2

Figure 1:
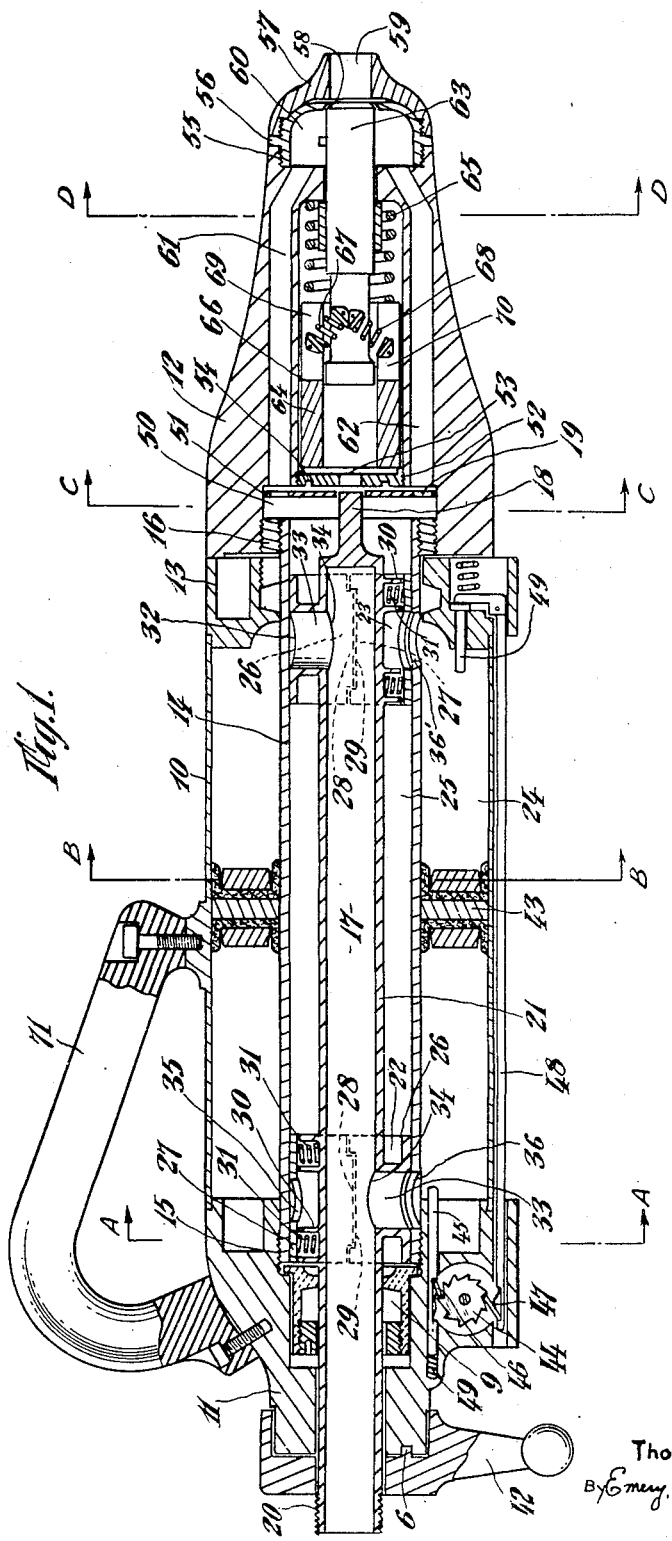

Fig. 14 is a section on line XIIII—XIIII of Fig. 8;

Fig. 15 is a section on line XV—XV, Fig. 8;

Figs. 16 and 17 are respectively sectional views illustrating the main valve structure in the two operating positions, respectively, and Fig. 18 is a plan view of the meter dial.

Referring first to Figs. 1-7 the apparatus shown in these figures consists of a shell-like casing comprising a cylindrical body part 10, a rear end cap 11, a front nozzle part 12, and a ring 13 disposed between the forward end of the part 10 and the nozzle part 12.

A valve sleeve 14 is disposed axially inside the casing and has one end screwed into a neck 15 in the end cap 11 and its forward end screwed into a ring 16 which in turn is externally screwed into the rear end of the nozzle part 12. A tubular valve structure 17 is disposed inside the sleeve 14, the front end of the structure being closed and provided with two pins 18 engaging in a central slot in a throttling disc 19 (Fig. 3) which is disposed in the rear end of the nozzle part 12 and is hereafter more fully described. The rear end of the tubular valve structure passes through a packing gland 9 in the cap 11 and projects beyond the rear end cap 11 and is screw-threaded at 20 for the purpose later to be described.

The valve structure comprises a tube 21 having at each end a cylindrical pressure cap device 22, 23 by means of which a liquid-tight joint is provided at each end between the outer annular chamber 24 formed in the part 10 of the casing and the chamber 25 formed inside the valve sleeve 14. Each pressure cap device comprises two semi-cylindrical parts 26, 27 (Figs. 1 and 3), of which part 26 is fixed, e. g. by welding, to the tube 21, and the part 27 is loose. The two complementary parts 26, 27 are fitted together by two projections such as 28 in one part engaging corresponding recesses such as 29 on the other part. Two sockets 30, 30 are welded to the tube 21 at each end thereof and house respectively springs 31, 31 pressing outwardly on the loose part 27 to form the liquid-tight joint between the pressure caps and the interior surface of the sleeve 14.

The two fixed parts 26, 26 are disposed respectively on opposite sides of the tube 21 and each is provided with a port 32 having a wall 33 fixed in a liquid-tight manner around a port 34 in the tube 21, the ports 32, 34 being commonly referred to hereafter as the "inlet port."

The two loose parts 27, 27 each have a port 35, each of which is referred to hereafter as a "transfer port." It will be appreciated from the foregoing that the inlet and transfer ports at one end of the tube 21 are displaced by 180° respectively with the inlet and transfer ports at the other end of the tube 21.

The inlet and transfer ports at each end of the tube 21 are adapted to be alternately brought into register with ports 36, 36' in the valve sleeve 14, the arrangement being such that the inlet port at one end of the tube is in register with the associated port 36 at the same time as the transfer port at the other end of the tube is in register with the associated port 36'. Means are provided for reversing the ports in register with the ports 36, 36' these means comprising a lever 42 connected, for example by a grub screw (not shewn) to the rear of the tube 21, immediately in front of the screw 20 so that by rotating the lever through 180° the tube 21 is correspondingly rotated thus bringing the ports 36, 36' into register with the ports on the opposite side of the valve. The lever has a pin 6 engaging in a semi-circular slot 5 in the end cap to limit the rotation of the lever in either direction.

An annular piston 43, Figs. 1 and 4, is arranged for reciprocation in the chamber 24 under the action of a pressure liquid as hereafter described, the outer and inner walls of the piston making respectively fluid-tight joints with the inner surface of the cylinder 10 and the outer surface of the valve sleeve 14.

The device includes a counter comprising a ratchet wheel 44 arranged to be advanced by one tooth each time the piston 43 moves to the end of its travel. The ratchet wheel is actuated by a spring pressed rod 45 having a pawl 46 engaging the ratchet wheel which rod is moved against its spring by the piston 43 when the latter reaches the end of its rearward travel. A second pawl 47 engages the ratchet and is actuated through a rod 48 by a second spring pressed rod 49 when the piston reaches the end of its forward travel. The ratchet wheel 44 is thus advanced by one tooth on the completion of each stroke of the piston 43.

The front nozzle part 12 is in the general form of a hollow nose having a rear chamber 50 limited by an internal flange or shoulder 51, the wall of the chamber 50 being screw-threaded to receive the screwed ring 16. The inner periphery of the flange 51 is screw threaded to receive a corresponding screwed disc 52 having a small central through aperture 53 and two depressions 54, 54 to receive a tool for screwing and unscrewing the disc.

The front end of the nozzle part is internally screwed to receive a nozzle member 55 having an intermediate flange 56 with a milled periphery and a second screw thread beyond the flange 56 to receive a nose cap 57. The nozzle member 55 has an outlet 58 in register with an outlet 59 in the nosecap.

Passage for liquid between the chamber 50 and the nozzle chamber 60 is afforded by two series of ducts 61, 62 (three in each series) bored in the wall of the nozzle part (Figs. 1, 5 and 6). The number of ducts can of course be varied to meet requirements.

The throttling disc 19 has two recesses 4, 4' (Fig. 5) arranged to uncover more or less the ends of the ducts 61, 62.

The opening of the nozzle outlet 58 is regulated by a lift valve in the form of a piston valve 63 which is controlled by a pressure actuated piston 64. To this end the working surface of the pressure actuated piston 64 is pressed by a spring 65 against the front side of the disc and is formed with a skirt portion 66 to receive the rear end of the piston valve 63. The latter is slidably mounted in the skirt 66 and is moreover connected thereto by two springs 67, 68 arranged in the form of toggles, the inner ends of the springs being connected to the piston valve and the outer ends being anchored in slots 69, 70 in the piston skirt 66. The arrangement is such that the pressure normally exerted by the spring toggles presses the piston valve on to the nozzle member closing the nozzle outlet. However if the piston 64 is moved forwardly by pressure acting through the aperture in the disc the toggles snap past the dead centre position and move the piston valve 63 rearwardly to open the nozzle outlet. If now the actuating pressure falls off the spring 65 previously compressed by the forward movement of the piston 64 moves the piston 64 back to the initial position, which again moves the spring toggles 67, 68 and causes them to snap back again through the dead centre position into the position shown in Fig. 1 in which they again press the piston valve 63 on to the nozzle outlet 58 to close it.

The device is provided with a handle 71 screwed to the cylinder 10 and rear end cap 11 to facilitate handling.

The tool above described is to be used for delivering a measured quantity of lubricating oil into the engine of an automobile and to this end the oil in the supply tank is placed under a press of 30 lbs./sq. in. and the screwed end 26 of the tube 21 is screwed into the correspondingly screwed end of a flexible hose connected to the outlet from the supply tank, this hose being sufficiently long to provide a limited mobility to the tool. The capacity of the annular chamber 24 corresponds to the measured quantity to be supplied which in the form described is one pint.

The operation of the tool is as follows:

With the pressure caps 22, 23 in the relative positions shown in Fig. 1, on connection of the tool to the supply hose oil under the pressure in the supply tank will enter the tubular valve 17, pass through the ports 34, 36 into the chamber 24 behind the piston 43 and press the latter forwardly to the end of its forward travel, when the chamber 24 will be full. On the end of its forward stroke the piston 43 will actuate the pin 49 to turn the ratchet 44 by one tooth, as above described.

The interior of the valve structure 17 will also be filled with oil but, as will be seen, this in no way affects the delivery of the required measured quantity to the container. The tool can be left in this condition until it is required to supply a customer, whereupon the nozzle end of the tool is inserted in the filling aperture of the customer's vehicle and the operating lever 42 is turned through 180° whereby the port 35 of the pressure cap 22, and the ports 32, 34 of the pressure cap 23, are respectively brought into alignment with the associated ports 36, 36' in the valve sleeve 14. The oil in the valve structure 17 can now under the pressure of the fresh incoming oil, pass through the port 32 into the chamber 24, in front of the piston 43, and the measured quantity of oil in the chamber 24 behind the piston can pass out through the rear ports 36, 35 into the transfer chamber 25. The pressure in the transfer chamber is lower than that of the oil entering in front of the piston 43, which thus drives the latter to the end of its rearward travel transferring the previous charge of oil completely into the transfer chamber and recharging the chamber 24 with a fresh measured quantity, this time in front of the piston 43. On the completion of its rearward stroke the piston 43 again actuates the ratchet wheel, to turn it by one tooth, through the pin 45 and pawl 46.

The oil passing into the transfer chamber builds up pressure in the chamber 50 due to the restricted outflow through the ducts 61. This pressure acts on the piston 64 through the aperture 53 in the disc 52 to move the former forwardly against the spring 65, whereby the outer ends of the toggle springs 67, 68 are moved from the position shown in Fig. 1 to the right beyond the dead centre position. In this way the pressure of the toggle springs previously exerted to close the piston valve 63 against the nozzle outlet 58 is now exerted to move the piston valve rearwardly, uncovering the outlet 58, and thus permitting the oil in the transfer chamber 25 to pass out through the outlets 58, 59. When all the oil in the transfer chamber has been discharged the pressure in the chamber 50 drops suddenly, with the result that the piston 64, and with it the toggle springs 67, 68 is returned by the spring 65 to the position shown in Fig. 1, whereby the piston valve 63 is applied with a snap action to seal the outlet 58.

It will be understood from the foregoing that during the delivery of one measured quantity through the nozzle outlet another measured quantity flows into the annular chamber 24, and that in order to discharge each such measured quantity the valve lever 42 must be turned through 180° in order to reverse the ports in the pressure caps 22, 23.

The rate of delivery can be regulated by turning the lever 42 to turn the throttling disc to uncover more or less the ends of the ducts 61, 62 as will be clear on referring to Fig. 5.

It should be noted that when the device is first fitted on to the flexible supply tube, air in the annular chamber 24 must be evacuated by filling and discharging the chamber at least twice, before the oil discharged is supplied to a customer, since by reason of the air initially in this chamber on opposite sides of the piston the required measured quantity can not be supplied until the air is exhausted.

It has been found with an experimental model of the device described that the measured quantity can be delivered in a very short time, about 4 seconds and a device according to the invention ensures that oil is delivered in the condition in which it is in the storage tank, i. e. it is delivered free from dirt or other foreign matter such as may be present in the case of open containers into which a measured quantity is poured, which can be left lying about the premises exposed to contamination of many kinds.

The modified form of apparatus shown in Figs. 8–12 comprises a cylindrical shell-like casing 100 fitted with front and back end caps 101, 102, a front nozzle part 103 connected to the front end cap 101 by a ring 104, a valve sleeve 105 disposed axially in the casing 100, a piston 106 arranged to reciprocate in the annular chamber 107 between the sleeve 105 and casing 100, a tubular valve structure 108 disposed axially inside the sleeve 105, and a handle 109 secured to an extension 110 of the valve 108 structure, which extension projects beyond the end of the casing 100, the handle serving for rotating the valve structure 108 to bring valve inlet and outlet ports therein respectively into and out of alignment with ports 111, 112 in the valve sleeve 105.

The tubular valve structure 108 is made of steel and comprises an intermediate part of reduced diameter and two conical end parts 113, 114 of larger diameter. The front valve part 113 seats in a bronze seating 115 having a cylindrical outer surface but suitably tapered internally to receive the valve, and force fitted into the front end of the valve sleeve 105 to obtain a fluid tight joint between the seating and the sleeve. The valve part 113 has two ports 116, 117 separated angularly by 120°.

The rear valve part 114 is similarly shaped to the front valve part and likewise has two ports, namely, a port 118 at the end of an inlet passage 119, and a port 120, the two ports being separated angularly by 120°. In addition the rear valve part 114 has one or more passages 121 (these passages are shown in Figs. 10 and 12) providing communication between the inlet passage 119 and a chamber 122 formed between the walls of the sleeve 105 and the valve structure 108 and referred to hereafter as the "sleeve chamber," this communication being established in both operative positions of the valve structure. The rear valve 114 also seats in a bronze seating 123 suitably tapered internally to receive the valve. For the purpose of assembly and to allow for taking up wear the rear seating 123 is fitted in the valve sleeve in the following manner. After insertion of the valve structure 108 through the rear end of the sleeve 105, the seating 123 is slidden into the sleeve 105 over the valve 114, with which it has a sliding fit. An annular depression 124 is provided around the seating 123 and an oil retaining packing ring 125 is next slipped over the seating into the depression 124, the ring 124 being narrower than the depression. An annular distance ring 126 is next inserted so as to bear against the ring 125, the distance ring 126 having an aperture 127 to register with the port 118 in the sleeve 105. A second similar packing ring 128 is now inserted followed by a gland nut 129 which is screwed on to a rear extension 130 of the seating 114 to compress the packing rings 125, 128. The gland nut 129 is formed on its rear surface with a castellated ring 131, to receive a projection 132 carried on a locking ring 133, the projection 132 extending also radially to engage a slot 134 in the sleeve 105.

The bore of the locking ring 133 is formed with two oppositely disposed flats 135, 135¹ arranged to slide on corresponding flats 136, 136¹ on the smooth end of the seating 114 so as to prevent relative rotation between the ring and the seating. The arrangement thus effectively locks the seating 114 against relative rotation between the sleeve 105 and seating whilst permitting relative sliding movement between the seating assembly and the sleeve 105. A relatively powerful spring 137 bears between the end cap 102 of the casing 100 and the locking ring 133 and serves to press the seating assembly into fluid tight contact with the valve 114. The flexible mounting of the seating 123 thus allows for taking up wear.

The front nozzle part 103 comprises a cylindrical casing 138 screwed at its rear end to the ring 104 and at its front end to a nosepipe 139 having a central outlet 140. The rear end of the casing 138 has an internal screw thread 141 engaged by a correspondingly screwed flange 142 of a sleeve 143, the front end of which has a screw connection 144 with a nozzle member 145 in such a way as to form a chamber 146 between the rear end of enlarged diameter of the nozzle 145 and the skirt portion 147 of a piston 148, a spring 149 being disposed in the chamber 146 and bearing forwardly on the rear surface of the nozzle member 145 and rearwardly on the skirt 147 of the piston 148. The latter has two oppositely disposed slots 149, 150, in which the ends of two toggle springs 151, 152 are respectively connected, the other ends of the toggles being connected to a piston 153 slidably mounted in borings in the nozzle member 145 and in the skirt 147 of piston 148 and constituting a valve controlling the opening and closing of the nozzle outlet 154.

Communication between the spring chamber 146 and atmosphere is permanently provided by a passage 155 drilled in the nozzle member 145 and in permanent communication with atmosphere through an outlet 156 drilled in the wall of the nosepiece 139. This passage 155 serves to allow air in the chamber 146 to be exhausted readily to atmosphere when the piston 148 moves forwardly under built-up pressure.

The piston 148 has an axial extension 157 projecting through a chamber 158 formed between the piston 148 and the valve seating 115. This extension has an upstanding foot 159 against which bears one arm of a pivoted bell crank lever 160 pressed by a spring 161. When the piston 148 moves forwardly under pressure built up in the chamber 158 the lever 160 is moved against the action of its spring and its free arm enters a slot 162 in a flange 163 screwed into the front end of the valve part 113, in which position it is locked by a locking screw, (not shown) thus preventing subsequent rotation of the valve structure 105 to re-set the valve ports until the built-up pressure drops, which only takes place when the full measured quantity has been delivered. When the pressure drops the piston 148 is returned by the spring 149 and the arm of the lever 160 is withdrawn from the slot 162 under the action of its spring 161.

The means provided for varying the rate of delivery are different from those shown in Fig. 1. In the present arrangement these means comprise one or more apertures (six in the form shown) 164 drilled in the wall of the nozzle 145 near the front end thereof and a sleeve 165 slidable along the nozzle to cover or uncover the aperture or apertures 164 more or less to vary the rate of flow of the liquid passing from a chamber 166 surrounding the nozzle to the outlet 154. The position of the sleeve 165 is adjusted as required by a lever 166 having a forked end 167 surrounding the nozzle casing 139 and fixed to a spindle 168 rotatably mounted transversely of the casing, and a forked member 169 fixed to the spindle 168 inside the casing and carrying pins 170 engaging respectively in opposite sides of a groove 171 in the sleeve 165. The arrangement is such that depression of the lever 166 rotates the spindle 168 which rocks the forked member 169 and moves the sleeve 165 back against the action of a spring 172 to uncover more or less the aperture or apertures 164. When the lever 166 is released the spring 172 returns the sleeve 165 to a position in which it can completely close the opening or openings 164, or to a position in which the opening or openings 164 is or are closed to a maximum extent.

The handle 109 has an aperture 173 by means of which it is passed over the extension 110 of the tubular valve structure 108 the handle being secured to the extension by a locking nut 174 screwed onto the end of the extension 110. The handle has a boring 175 to provide an inlet for the liquid to be dispensed, and a screw thread 176 at the end of the boring 175 for connection to a flexible hose, the other end of which is connected to a supply of the liquid under pressure to be dispensed. The wall of the valve extension 110 is drilled with an aperture 177 to afford communication between the bore 175 and the inlet passage 119 of the valve structure 108.

The piston 106 is arranged to actuate the mechanism of a meter 178 for indicating the quantity of liquid sold to a customer. This meter may also include totalising mechanism 179 for indicating the total amount of liquid dispensed by the device. For the purpose of operating the meter mechanism two spring pressed plungers 180, 181 are arranged to project respectively into opposite ends of the chamber 107, leakage from the chamber as a result of the plungers penetrating therein being prevented by leather oil seals 182, 183. The transmission between each plunger and the meter mechanism is similar. Each transmission comprises a lever 184 pivoted at 185, the lower end of the lever 184 being operable by a plunger 180 or 181 and the upper end of the lever being connected to a push rod 186 slidably mounted in a tube 186$^1$ outside and parallel with the casing 100, and projecting into the casing of the meter 178. The push rod 186 actuates a block 187 slidingly mounted in slots 188 in the base plate of the meter casing, which block carries a spring loaded pawl 189 pressed by its spring into engagement with a tooth on a ratchet wheel 190 having eight such teeth, the two sliding blocks 187 of the two transmissions operating in opposite directions so that each working stroke of each block rotates the ratchet wheel 190 by one tooth. Return springs 191, 192 and 193 are provided to return the parts 184, 186 and 187 respectively after they have been actuated. The arrangement, therefore, is such that as the piston 106 reaches the end of a stroke it strikes the corresponding plunger 180 or 181, which actuates the associated transmission to turn the ratchet wheel 190 by one tooth. The ratchet wheel 190 is rotatably mounted on the lower part 194 of a spindle comprising two parts 194, 195 screwed into one another, and drives the pointer 196 in one direction only through a clutch comprising an expanded spring ring 197 fixed to the ratchet wheel 190 so as to expand inside a sleeve 198 fixed to the pointer 196. This sleeve 198 is rotatably mounted on the upper spindle part 195 and is arranged to be driven in one direction only, i. e. the opposite direction to that in which it is driven by the ratchet wheel, by a zero setting knob 199 through an unidirectional clutch 200 comprising teeth on the inner surface of the sleeve 198 engaged by a pin 201 fixed to the knob, the zero setting movement being limited by a spring pressed pawl 202 arranged to ride over the periphery of a disc 203 fixed to the ratchet wheel 190 until it is arrested by butting against a stop 204 on the disc 203. The ratchet wheel 190 is located after each turning movement by a spring loaded locating plunger 205 arranged to engage the teeth of the ratchet wheel. The pointer 196 moves over a calibrated circular dial 206 bearing the markings 0–7 respectively, in equi-angular relationship, these markings in the present case representing pints, for example of lubricating oil. The totalising mechanism 179 is operated by a disc 207 fixed on the ratchet spindle 194 and having a single tooth 208 which turns the units wheel 209 of the totalising mechanism by one tooth for each complete revolution of the ratchet wheel 190. The tens and hundreds wheels 210, 211, respectively, of the totalising mechanism are turned by similar single-tooth discs 212, 213 on the units and tens wheels respectively to denote totals of tens and hundreds of gallons. The pointer 196 thus indicates any one sale up to eight pints or one gallon, which is a greater quantity than is normally supplied in any one sales operation direct into a motor car engine, and, in addition, the total sales are also recorded. After a sales operation the pointer 196 is reset to zero by rotating the knob 199 fixed to the ratchet spindle.

The operation of the device will be described in connection with its use for delivering measured quantities of lubricating oil into the engines of automobiles, aircraft and the like, the chamber 107 being designed in this particular case to deliver one pint of lubricating oil on each stroke of the piston 106. The apparatus is installed as above described by screwing a flexible hose of suitable length to provide for limited mobility on to the screw thread 176 of handle 109, and the oil in the supply tank is placed under pressure by means of compressed air supplied to the tank through a reducing valve adjusted to maintain a pressure of 35-40 lbs. per sq. inch.

When the instrument is first installed it must be primed before use in order to expel all air, and this is carried out in the following manner.

In Fig. 8 the valve structure is shown in a neutral position, but assuming control handle 109 is in the extreme anti-clockwise position when the device was connected, it is now turned clockwise through 120° this being the full amount of its rotation. As a result of this rotation the positions of the various ports and passages in the valve structure 108 are moved from the positions shown in Fig. 17 to the positions shown in Fig. 16 in which figure the oil flow is indicated by arrows. As indicated by the arrows oil under pressure flows through inlet passage 119 and ports 118, 127, 111 to the right hand side of piston 106 (as viewed on the drawing) and the piston 106 moves to the left compressing the air in chamber 107 on the left hand side of the piston 106, which is discharged through the outlet 112 and passes into the chamber 158 where pressure is built up to operate the nozzle piston valve 153 in the manner described in connection with Figs. 1-7, whereby the air is discharged to atmosphere. Oil also enters the sleeve chamber 122 compressing the air therein. When the piston 106 reaches the end of its travel, the chamber 107 is full of oil, and the handle 109 is now turned anti-clockwise through an angle of 120°, changing the valve ports and passages from the positions shown in Fig. 10 to the positions shown in Fig. 11.

In the new positions of the valve ports and passages oil entering the device through the inlet passage 119 passes through the passage 121 into the sleeve chamber 122 and forces the air previously compressed therein through the port 116, and into the chamber 107 on the left of the piston 106 as shown by the full line arrows. The piston 106 now moves to the right, expelling the oil previously drawn in through the ports 111, 127 and 120 (as shown by dotted arrows) into the body of the tubular valve, and to the chamber 158 where the piston valve 153 is again operated to discharge it. The chamber 107 on the left hand side of piston 106 is now full of oil. The above two operations should be again repeated to ensure that no air is trapped in any part of the device, and the device is then ready for use.

In subsequent use the operation is similar to that above described, but oil is now delivered instead of air, the handle being turned alternately clockwise and anti-clockwise for successive deliveries. Each time the handle is turned a fresh charge of oil is drawn into the chamber 107 at the end in which the piston 106 is disposed; the pressure of the incoming oil is greater than that of the measured quantity on the opposite side of the piston with the result that the piston is moved to the opposite end of its stroke, expelling the measured quantity of oil through the corresponding valve ports into the chamber 158 from which the flow is restricted as described and consequently the necessary pressure is built up to operate the piston valve 153 to discharge the oil. The pressure is maintained in the chamber 158 until the whole of the measured quantity has passed into the nozzle chamber 166 whereupon the pressure drops and the piston valve 153 is automatically returned by the spring 149 to close the nozzle outlet 154.

It should be noted that the sleeve chamber 122 is always full of oil at the pressure prevailing in the supply tank and exerts an equal pressure on each of the conical valve ends 113, 114.

As above described the rate of flow from the nozzle outlet can be controlled by the manually operated sleeve valve 165. Shallow slots may be machined in the front face of the sleeve to ensure, if desired, that the apertures 164 always remain slightly uncovered so that the flow cannot be entirely arrested.

Once the handle 109 has been turned to deliver a measured quantity it cannot be again operated until the full measured quantity has been delivered, by reason of the pivoted locking lever 160 above described, which prevents subsequent rotation of the valve structure until the pressure in the chamber 158 drops sufficiently to allow the piston 148 to withdraw the locking lever 160 from the slot 162 in the valve seating 113.

What I claim and desire to secure by Letters Patent is:

1. In apparatus for delivering measured volumes of liquid under pressure, an automatic valve comprising a control piston subject to pressure variations in the liquid to be delivered, a lift valve slidably mounted relatively to said control piston to control a nozzle outlet, a toggle device operatively connecting said lift valve to said control piston, a return spring operatively disposed between said lift valve and said control piston, the arrangement being such that the control piston can move under pressure relatively to said lift valve to actuate said toggle device to withdraw said lift valve and open said nozzle outlet, said return spring restoring the parts to their starting positions when the pressure drops.

2. In apparatus for delivering measured volumes of liquid under pressure, an automatic valve comprising a control piston subject to pressure variations in the liquid to be delivered, a lift valve slidably mounted relatively to said control piston to control a nozzle outlet, a resilient toggle device operatively connecting said lift valve to said control piston, a return spring operatively disposed between said lift valve and said control piston, the arrangement being such that the control piston can move under pressure relatively to said lift valve to actuate said toggle device to withdraw said lift valve and open said nozzle outlet, said return spring restoring the parts to their starting positions when the pressure drops.

3. Apparatus as claimed in claim 2 wherein said resilient toggle device comprises springs having their ends connected respectively to said lift valve and to said control piston.

4. Apparatus as claimed in claim 2 further comprising means for regulating the rate of discharge of the liquid from the outlet of the device.

5. Apparatus as claimed in claim 2 further comprising means for regulating the rate of discharge of the liquid from the outlet of the device, said means comprising a manually operated throttling disc arranged to vary the flow of liquid to the outlet.

6. Apparatus as claimed in claim 2 further comprising means for regulating the rate of discharge of the liquid from the outlet of the device, said means comprising a series of apertures in the wall of said nozzle outlet through which the liquid must pass to the outlet, a sleeve slidably mounted on the wall of the nozzle, and manual means for moving the sleeve to uncover these apertures to a greater or less extent.

7. In apparatus for delivering measured volumes of liquid under pressure a manually controlled valve for opening and closing liquid inlet and outlet ports comprising a tubular valve structure having conical ends in which are formed the inlet and outlet ports, and conical seatings in which the conical valve ends are rotatably mounted, one of said seatings being fixed in a valve sleeve having complementary parts and the other seating being axially adjustable under spring pressure in the valve sleeve, both seatings forming fluid-tight joints with the valve sleeve.

8. In apparatus for delivering measured quantities of liquid under pressure, a chamber of predetermined volume, a piston slidably mounted in said chamber, manually operated valve means for alternately admitting the liquid to be delivered into, and for discharging it from, opposite ends of the said chamber, said manually operated valve means being mounted in a valve chamber disposed inside and coaxially with the chamber of predetermined volume.

9. In apparatus according to claim 8 an automatic valve for controlling a discharge outlet, said automatic valve comprising a control piston subject to pressure variations in the liquid to be delivered, a lift valve slidably mounted relatively to said control piston to control a nozzle outlet, a toggle device operatively connecting said lift valve to said control piston, a return spring operatively disposed between said lift valve and said control piston, the arrangement being such that the control piston can move under pressure relatively to said lift valve to actuate said toggle device to withdraw said lift valve and open said nozzle outlet, said return spring restoring the parts to their starting positions when the pressure drops.

10. Apparatus according to claim 9 wherein the lift valve of said automatic valve is in axial alignment with said manually operated valve means.

11. Apparatus according to claim 9 further comprising means for restricting the flow of liquid from the chamber of predetermined capacity to said automatic valve for the purpose of building up pressure to operate said control piston.

12. Apparatus according to claim 9 further comprising a sleeve forming the inner wall of the chamber of predetermined volume, said manually operated valve means comprising a tubular structure mounted in said sleeve, said structure being formed with two angularly spaced ports at each end arranged to be brought alternately into register respectively with a port adjacent each end of the sleeve.

13. Apparatus according to claim 9 further comprising a sleeve forming the inner wall of the chamber of predetermined volume, said manually operated valve means comprising a tubular structure mounted in said sleeve, said structure being formed with two angularly spaced ports at each end arranged to be brought alternately into register respectively with a port adjacent each end of the sleeve, the intermediate part of the tubular valve structure being of smaller diameter than the ends in which the ports are provided so as to form an annular chamber between the sleeve and the valve structure.

14. Apparatus according to claim 9 in combination with locking means disposed inside the chamber of predetermined volume and adapted when said control piston moves to open the lift valve to lock said manually operated valve means and prevent resetting thereof until the whole of the measured quantity has been delivered.

15. Apparatus according to claim 9 in combination with a register for indicating the amount of liquid delivered, and means for operating said register, said means comprising a spring-pressed member projecting into each end of said chamber of predetermined volume so as to be actuated on the completion of each piston stroke, and a transmission between each of said spring-pressed members and the mechanism of the meter.

THOMAS HAMILTON FAULKNER.

REFERENCES CITED

The following references are of record in the file of this patent:

UNITED STATES PATENTS

| Number | Name | Date |
|---|---|---|
| 419,778 | Kendall | Jan. 21, 1880 |
| 958,664 | Moore | May 17, 1910 |
| 1,137,861 | Johnson | May 4, 1915 |
| 1,938,621 | Cornell | Dec. 12, 1933 |